United States Patent

Ross et al.

[15] 3,640,366
[45] Feb. 8, 1972

[54] GRAVITY CONVEYOR

[72] Inventors: John M. Ross, Upland; Warren V. White, Ontario; Robert P. Wortman, Cucamonga, all of Calif.

[73] Assignee: Sunkist Growers, Inc., Los Angeles, Calif.

[22] Filed: Aug. 4, 1969

[21] Appl. No.: 847,017

[52] U.S. Cl. .................................... 193/7, 193/28, 193/32
[51] Int. Cl. .................................... B65g 11/10, B65g 11/20
[58] Field of Search ................... 193/7, 27–28, 32; 194/30

[56] References Cited

UNITED STATES PATENTS

| 846,751 | 3/1907 | Melvin | 193/32 X |
| 1,309,119 | 7/1919 | Dillon | 193/27 X |
| 1,734,102 | 11/1929 | Wolin | 194/30 X |
| 2,890,780 | 6/1959 | Schuricht | 193/27 |

Primary Examiner—Edward A. Sroka
Attorney—Paul A. Weilein

[57] ABSTRACT

A structure for gravitational conveyance of objects such as citrus fruit from an upper level to a lower level having a plurality of laterally and vertically spaced yieldable barriers staggered at successive levels to repeatedly interrupt the free fall of the objects.

34 Claims, 13 Drawing Figures

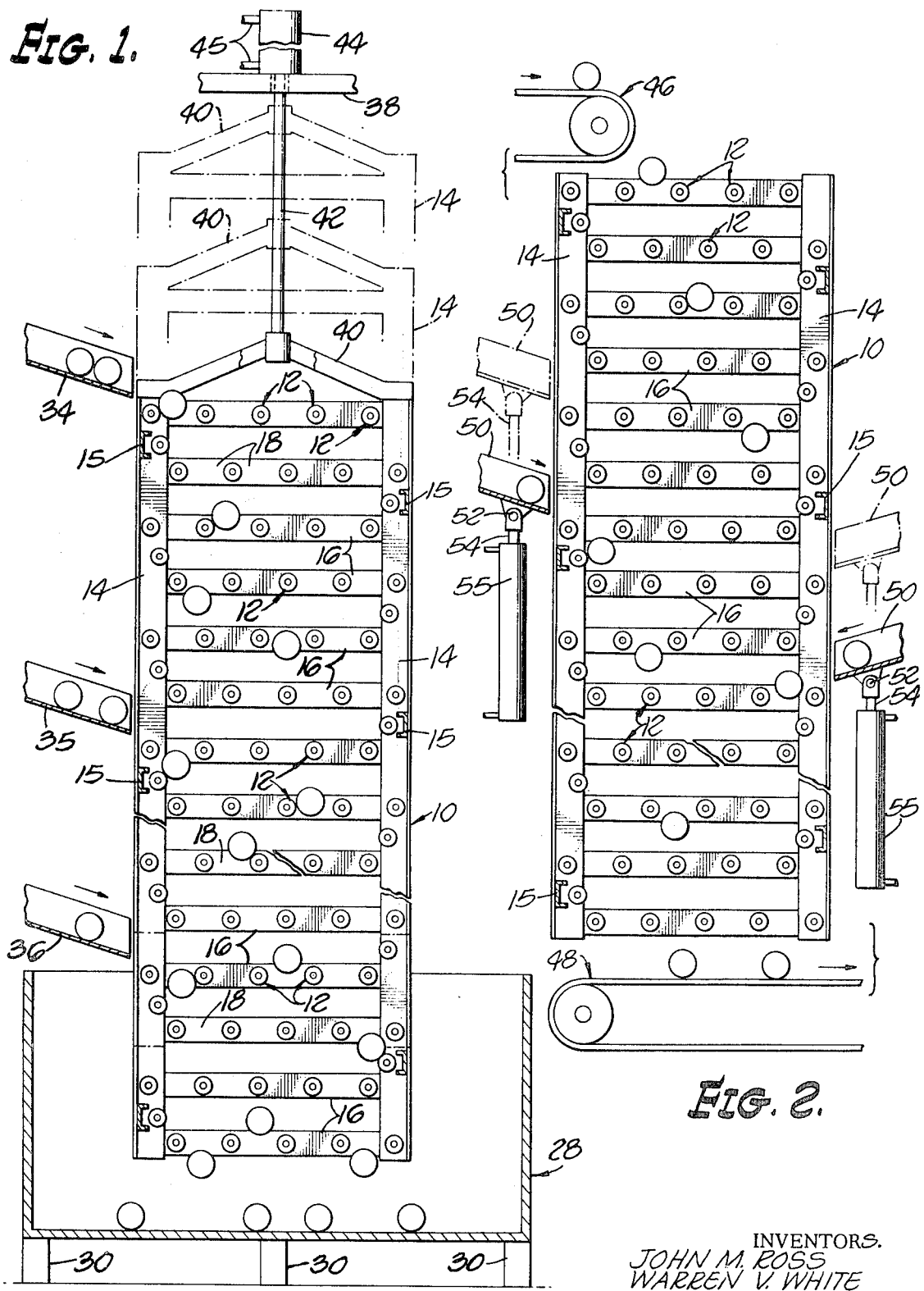

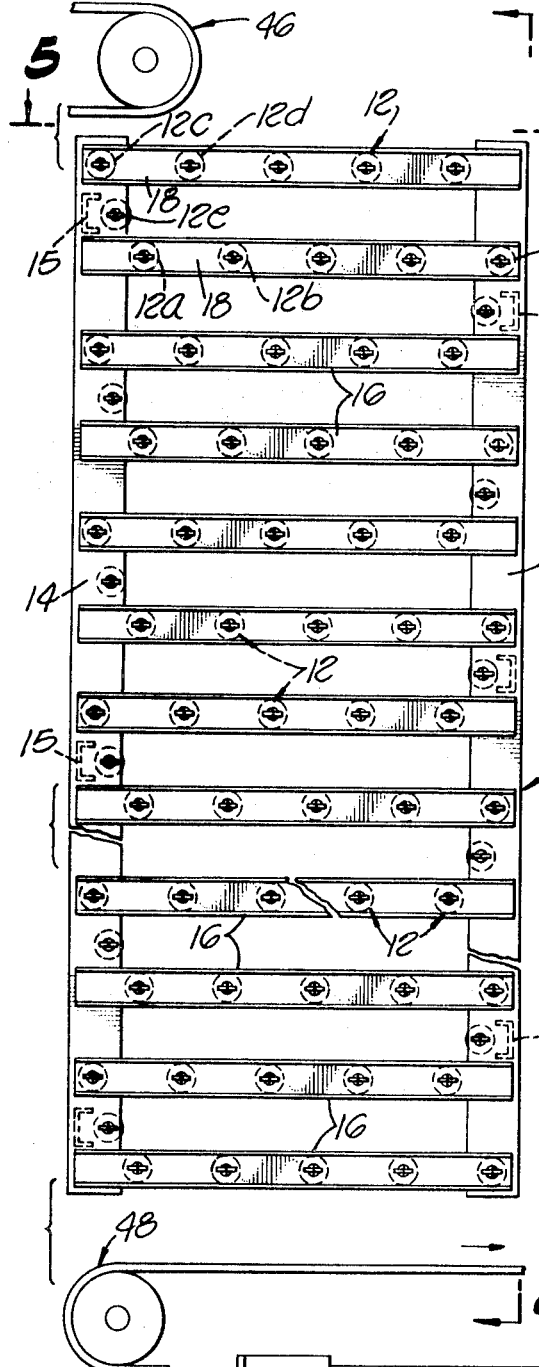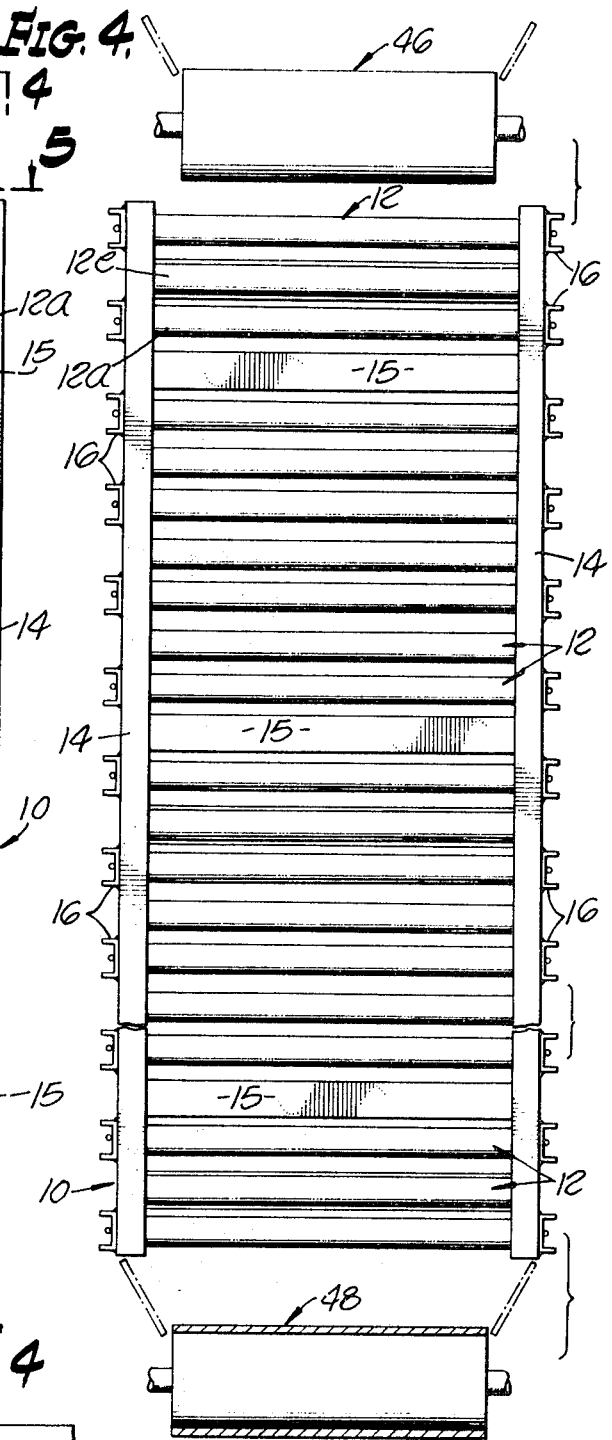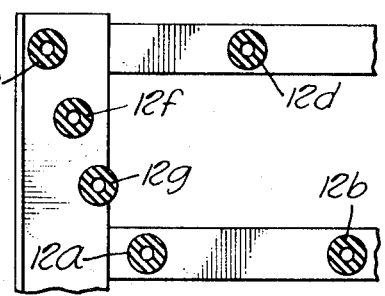

PATENTED FEB 8 1972

INVENTORS.
JOHN M. ROSS
WARREN V. WHITE
BY ROBERT R. WORTMAN

Paul A. Weilein
ATTORNEY

PATENTED FEB 8 1972

INVENTORS.
JOHN M. ROSS
WARREN V. WHITE
BY ROBERT R. WORTMAN

Paul A. Weilein
ATTORNEY

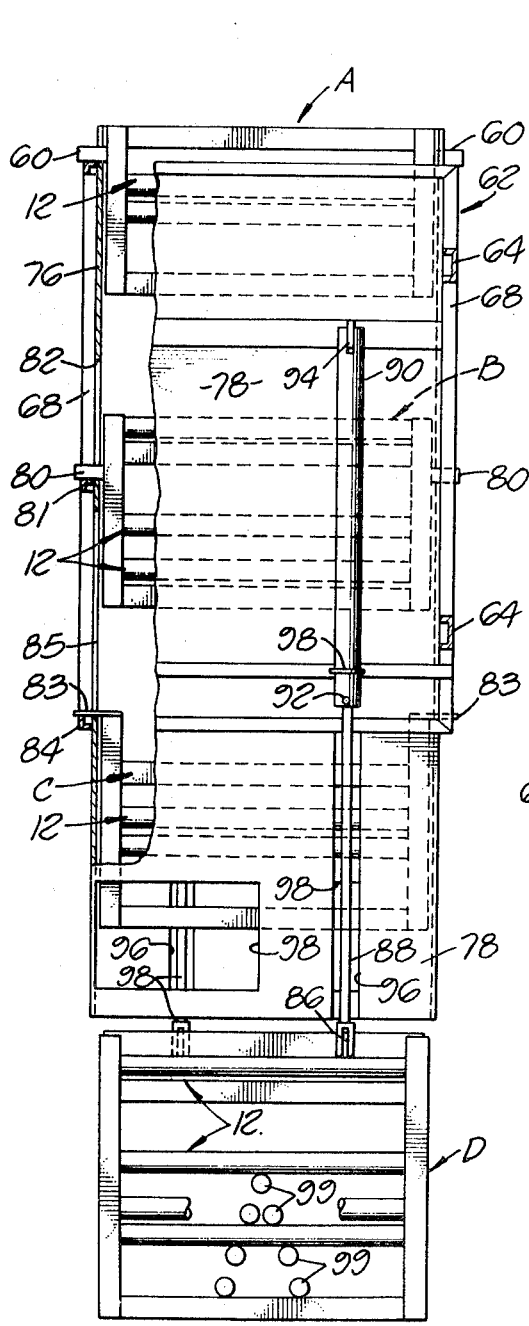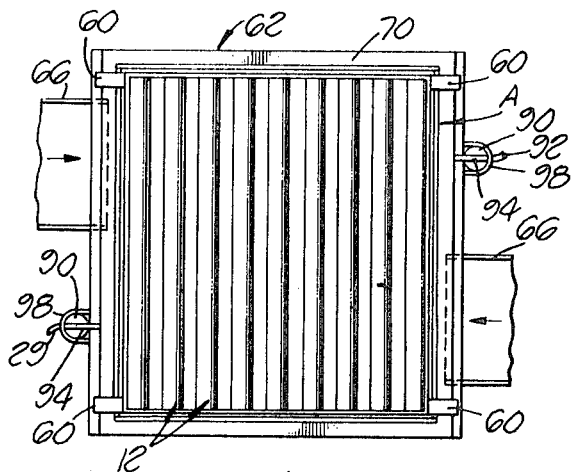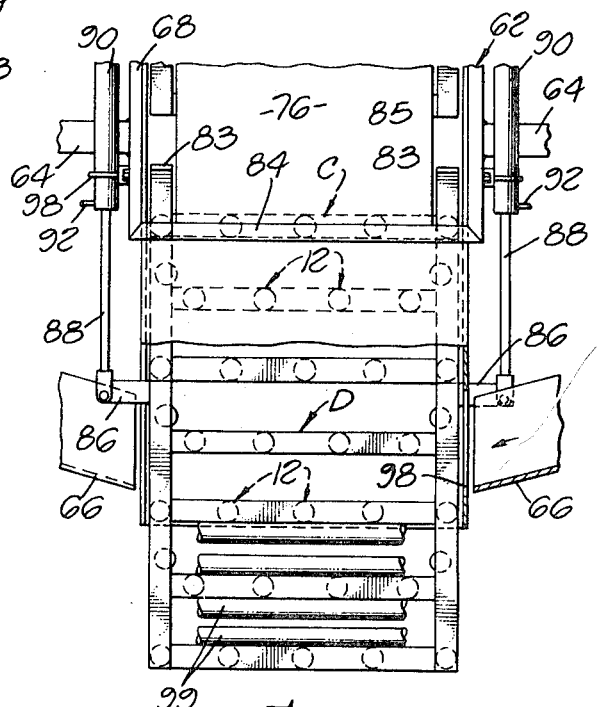
FIG. 11.
FIG. 12.
FIG. 13.
INVENTORS.
JOHN M. ROSS
WARREN V. WHITE
BY ROBERT P. WORTMAN
Paul A. Weilein
ATTORNEY

GRAVITY CONVEYOR

BACKGROUND OF THE INVENTION

The need arises in various situations for a simple and relatively inexpensive apparatus that is operable without power for continual gravitational conveyance of objects of more or less uniform size from a relatively high level to a lower level. For example, in some manufacturing procedures it is desirable for parts in process to gravitate downwardly from one work station to another or for finished articles to travel downwardly to a packing station. The problem to which the invention is particularly directed is to provide means for gravitationally lowering objects that are fragile or especially vulnerable to damage by impact. By way of example, the invention is described herein as a device for lowering citrus fruit from one level to a lower level.

In some prior art devices for this purpose, obstacles are provided at successive levels along one side of a gravitational path with insufficient clearance for the objects to pass the obstacles, the obstacles blocking the fall of the articles but being resilient to yield to the weight of the articles. For example, Laager U.S. Pat. No. 3,370,398 discloses successive counterbalanced obstacles; Vasey U.S. Pat. No. 1,114,318 discloses successive spring-loaded obstacles; and both the Gates et al. U.S. Pat. No. 3,348,647 and the Hill et al. U.S. Pat. No. 3,187,872 disclose yieldingly flexible obstacles.

One disadvantage of such prior art devices is that masses of the articles may swing the obstacles out of the way to permit damaging free fall of the articles. Another disadvantage is that a certain amount of time is required for each yielding obstacle to recover its full yieldability so that if two objects strike an obstacle in rapid succession the obstacle does not recover adequately to decelerate the fall of the second object.

Other prior art devices provide successive yielding baffles staggered along opposite sides of a gravitational path to successively deflect the falling objects. For example, Dedrick U.S. Pat. No. 715,560 discloses spring loaded baffles and both the Dorman U.S. Pat. No. 876,529 and the Miller U.S. Pat. No. 2,450,152 disclose cushioned baffles. Here again, time is required for each baffle to recover from an impact and when the objects fall in a mass on an obstacle or in rapid succession, the obstacles do not recover their yieldability in time for adequate protection of the falling objects from damage.

A further disadvantage of all of the above mentioned prior devices is that the devices present surfaces in the path of the fruit that tend to accumulate debris and particles of the fruit. What is needed is such a device that is self-cleaning to a large degree.

A broad object of the present invention is to void all of these disadvantages that are inherent in the above-mentioned prior art devices.

SUMMARY OF THE INVENTION

The invention provides a support structure that defines a zone for downward gravitational movement of fruit or other objects and further provides a plurality of barriers spanning the gravitational zone. The barriers are distributed laterally and longitudinally of the zone to provide a plurality of openings of greater cross dimension than the cross dimension of the objects for mass movement of the objects through the length of the gravitational zone. The barriers are so distributed as to repeatedly interrupt the free fall of the objects to limit the distance of free fall of the objects to fractions of the length of the gravitational zone. The distances of uninterrupted free fall are small enough to keep the objects from accelerating to such high velocity as to cause any significant damage to the objects by impact against the interrupting barriers.

In the presently preferred embodiment of the invention, the barriers are distributed laterally of each of successive intermediate levels in the gravitational zone to form a plurality of openings at each intermediate level with the openings of the successive intermediate levels staggered to form multiple zigzag paths for mass movement of the objects through the gravitational zone. Preferably, the barriers are substantially smaller in cross dimension than the fruit and are yieldable to minimize damage to the fruit. Such relatively narrow yieldable barriers cannot accumulate any substantial quantities of fruit fragments and other debris and therefore are substantially self-cleaning.

The preferred practice of the invention is further characterized by the use of barriers in the form of tubes of resiliently deformable material such as foamed plastic with coil springs extending through the tubes and anchored at both ends to the support structure for yielding support of the tubes. Such barriers are highly yieldable to minimize damage to the fruit and are especially advantageous in having large ranges of yielding action. Thus, if a plurality of fruit strike such a barrier simultaneously or in rapid succession, the barrier has, in effect, such a reserve of yielding action that the fall of each fruit is adequately cushioned.

The preferred practice of the invention is further characterized by a support structure of open construction that exposes the gravitating fruit to observation and also makes the gravitational zone accessible throughout the length for the introduction of fruit to gravitate to the lower limit level. The open construction of the support structure also makes all of the barriers freely accessible for inspection, repair, and any infrequent cleaning operations that may be desirable. In this regard, a special advantage of the preferred embodiment of the invention is that the support structure is of such open construction that a hose may be employed to flush away all debris inside the structure in a rapid and highly efficient manner.

As will be explained, a further feature of the invention is the concept of making such a gravity conveyor vertically extensible and contractable.

The various features and advantages of the invention may be understood from the following detailed description and the accompanying drawings.

BRIEF DESCRIPTION OF THE DRAWINGS

In the drawings, which are to be regarded as merely illustrative:

FIG. 1 is a side elevation of the preferred embodiment of the invention adapted to the purpose of filling field boxes with citrus fruit;

FIG. 2 is a similar side elevation of the same preferred embodiment of the invention illustrated as employed to receive fruit and to lower the fruit onto a lower conveyor belt;

FIG. 3 is an enlarged side elevational view of the same embodiment of the invention;

FIG. 4 is an elevation of the same embodiment as seen along the line 4—4 of FIG. 3;

FIG. 9 is a fragmentary sectional view similar to FIG. 6 showing how two deflecting barriers instead of one may be employed between two intermediate levels;

FIG. 11 is a plan view of the same embodiment;

FIG. 12 is a side elevational view partly in section of the same embodiment; and FIG. 13 is a fragmentary view similar to FIG. 10 with the structure contracted vertically.

DESCRIPTION OF THE PREFERRED EMBODIMENTS OF THE INVENTION

Figure 5:
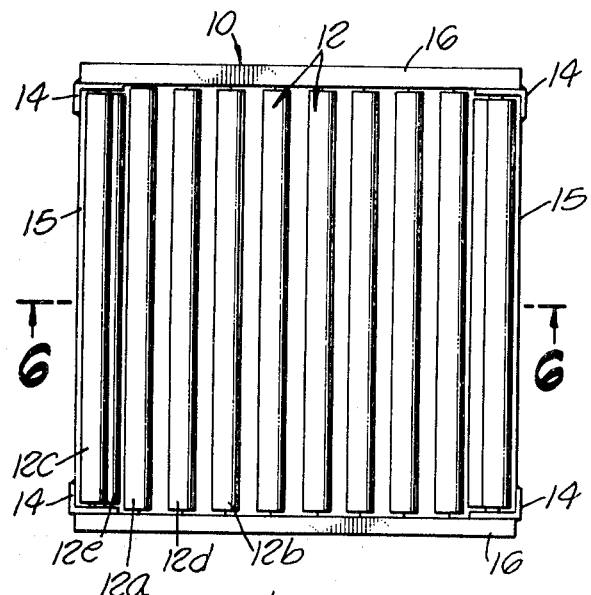
FIG. 5 is a plan view as seen along the line 5—5 of FIG. 3.

In FIGS. 1–8, an upright support structure generally designated 10 is spanned across its interior by a plurality of vertically and horizontally spaced barriers 12. In this instance, the support structure is a simple upright rectangular frame having vertical angle iron corner members 14 that are interconnected on two opposite sides of the structure by relatively widely spaced transverse channel irons 15 and are interconnected on the other two opposite sides by relatively closely spaced channel irons 16 that are paired to define uppermost and lowermost levels and successive intermediate levels of the support structure.

At each of the levels a plurality of equally horizontally spaced parallel barriers 12 span the interior of the structure to define a series of uniformly dimensioned openings 18 for passage of the fruit through the level.

Figure 7:
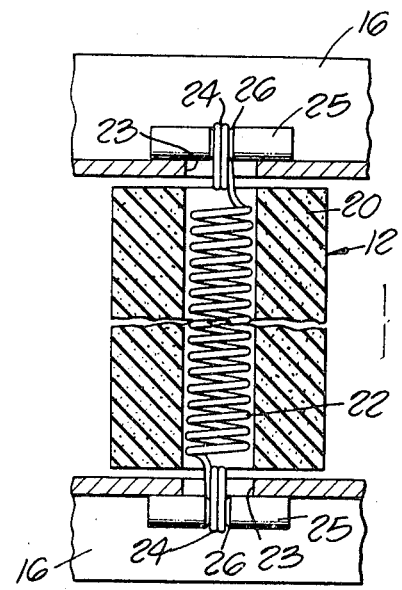
FIG. 7 is a greatly enlarged fragmentary longitudinal section of a barrier taken along the line 7—7 of FIG. 6.
Figure 8:
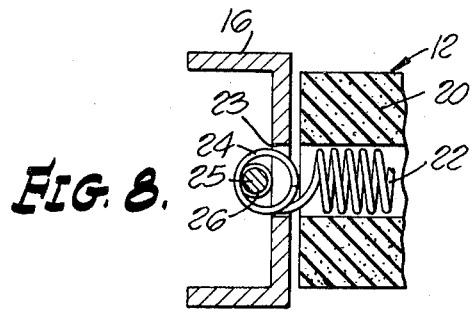
FIG. 8 is a similar fragmentary longitudinal section of a barrier taken along the line 8—8 of FIG. 6.

As shown in FIGS. 7 and 8, each of the barriers 12 preferably comprises a tube 20 of resiliently deformable foamed plastic with a supporting coil spring 22 extending through the tube and connected at its opposite ends to the support structure 10. In the construction shown, each end of a coil spring 22 extends through an aperture 23 in a channel iron 16 with a plurality of end coils 24 of the spring turned axially of the spring to embrace a cross pin 25 that extends across the aperture. Preferably, each of the cross pins 25 is formed with a central circumferential groove 26 as may be seen in FIG. 7.

In this particular practice of the invention each of the successive levels of the support structure 10 has five equally spaced transverse barriers 12, the five barriers defining four openings 18 that are wider than the maximum dimension of the fruit that is to be conveyed through the gravitational zone and the openings at each level are staggered relative to the openings of the preceding higher level. The barriers 12 are preferably substantially smaller in cross dimension than the maximum diameter of the fruit. Preferably, the barriers of each successive level are offset horizontally from the barriers of the preceding higher level by less than the minimum diameter of the fruit so that no fruit can drop through an opening of one level without encountering a barrier at the next lower level, but in all instances the barriers are arranged to prevent free fall of a fruit through a vertical distance sufficient to result in impact damage to the fruit.

In the initial embodiment of the invention, the plastic tubes 20 are approximately 1½ inches in diameter and the spacing of the tubes both horizontally and vertically may be 3 inches to 6 inches depending on the size of the fruit. For most sizes of oranges a spacing of 3½ inches or 4 inches is recommended and for most sizes of grapefruit the spacing may be 5 inches or 5½ inches with good results.

Since the openings 18 of each successive level are staggered relative to the openings of the preceding higher level, at each pair of successive levels an opening 18 at one end of the lower level of the pair is offset inwardly of the support structure from the corresponding end opening of the upper level of the pair. Thus, in FIGS. 3 and 6 an end opening 18 of the second level defined by two barriers 12a and 12b is offset inwardly from the corresponding end opening 18 that is defined by barriers 12c and 12d of the higher level of the pair.

Figure 6:
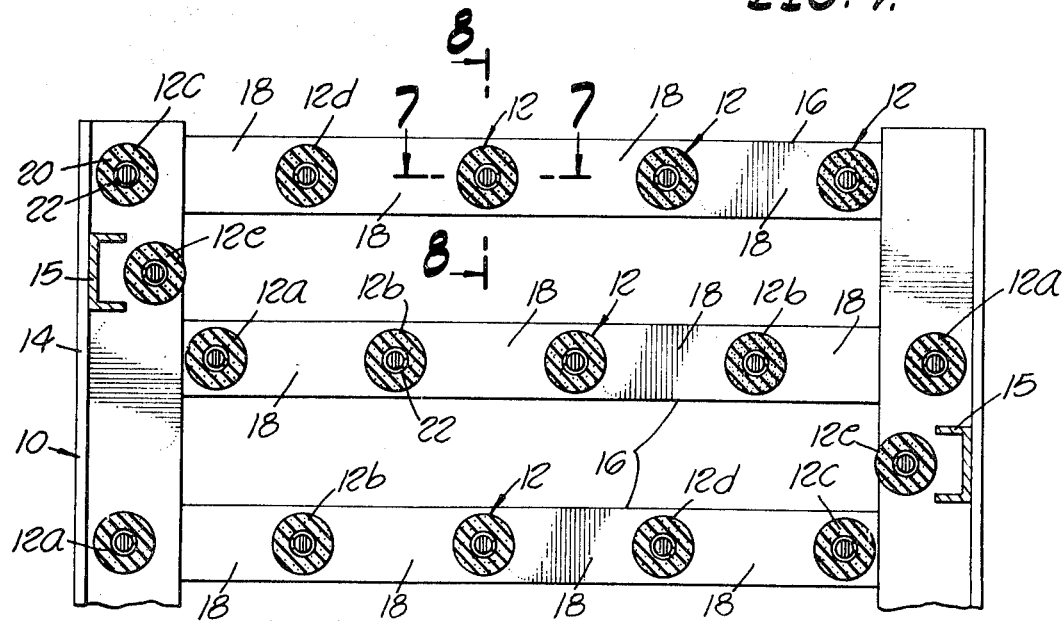
FIG. 6 is an enlarged fragmentary section of the structure taken along the line 6—6 of FIG. 5.

The invention teaches the provision of some means in the path of fruit falling from an end opening of the upper level of the pair of successive levels to deflect the falling fruit inwardly to be sure that the falling fruit does not escape laterally from the conveyor structure. For this purpose, as best shown in FIG. 6, a deflecting barrier 12e may be positioned below the previously mentioned barriers 12c and 12d in a position to block exit of the fruit laterally from the support structure so that any fruit that drops through the opening 18 between the upper barriers 12c and 12d and tends to escape from the support structure will be diverted to the space 18 that is defined by the two lower barriers 12a and 12b. In like manner, a deflecting barrier 12e is positioned at the opposite side of the support structure between the second and third intermediate levels of the gravitational zone, et cetera.

If the vertical spacing of the barriers 12 in the gravitational zone is more than 4½ inches, i.e., if the vertical spacing is 5 or 6 inches, two deflecting barriers instead of one may be employed between two successive intermediate levels. Thus, FIG. 9 shows diagrammatically how two successive deflecting barriers 12f and 12g may be located below the opening defined by a pair of upper barriers 12c and 12d to deflect falling fruit into the space 18 between two lower barriers 12a and 12b.

FIG. 1 shows how a support structure 10 may be employed in an orchard to lower citrus fruit into a field box or bin that is mounted on skids 30 to permit it to be handled by a lift fork. Workers on mobile elevated platforms (not shown) pick the citrus fruit directly from the trees and deposit them in gravity chutes that lead to various levels of the support structure 10. FIG. 1 shows an upper chute 34 from a relatively high picking platform that discharges fruit onto the upper end of the support structure 10 and lower chutes 35 and 36 from other picking platforms deliver the citrus fruit to intermediate levels of the support structure.

It is contemplated that the support structure 10 in FIG. 1 will be raised and lowered in accord with the amount of fruit that is deposited in a field box 28. Any suitable means may be employed to raise and lower the support structure, for example, a boom on a tractor, but in this instance the support structure 10 is suspended from an upper support member 38 of the structure of a mobile fruit-picking platform. The upper end of the support structure 10 is attached to a spider 40 on the lower end of a piston rod 42 that extends downwardly from an air cylinder 44 on the upper support member 38. Compressed air is supplied to the air cylinder 44 through two suitable conduits 45 for remote control of the elevation of the support structure 10.

In FIG. 2 the support structure 10 is located under the discharge end of an overhead belt conveyor 46 and above the receiving end of a lower belt conveyor 48 to lower citrus fruit from the upper conveyor to the lower conveyor. In addition, various gravity chutes 50 terminate adjacent opposite sides of the support structure to discharge fruit into the support structure at various intermediate levels. In the construction shown, each gravity chute 50 is connected by a pivot 52 to the upper end of a piston rod 54 that extends upwardly from a corresponding air cylinder 55 by means of which the gravity chute may be vertically adjusted by remote control.

Figure 10:
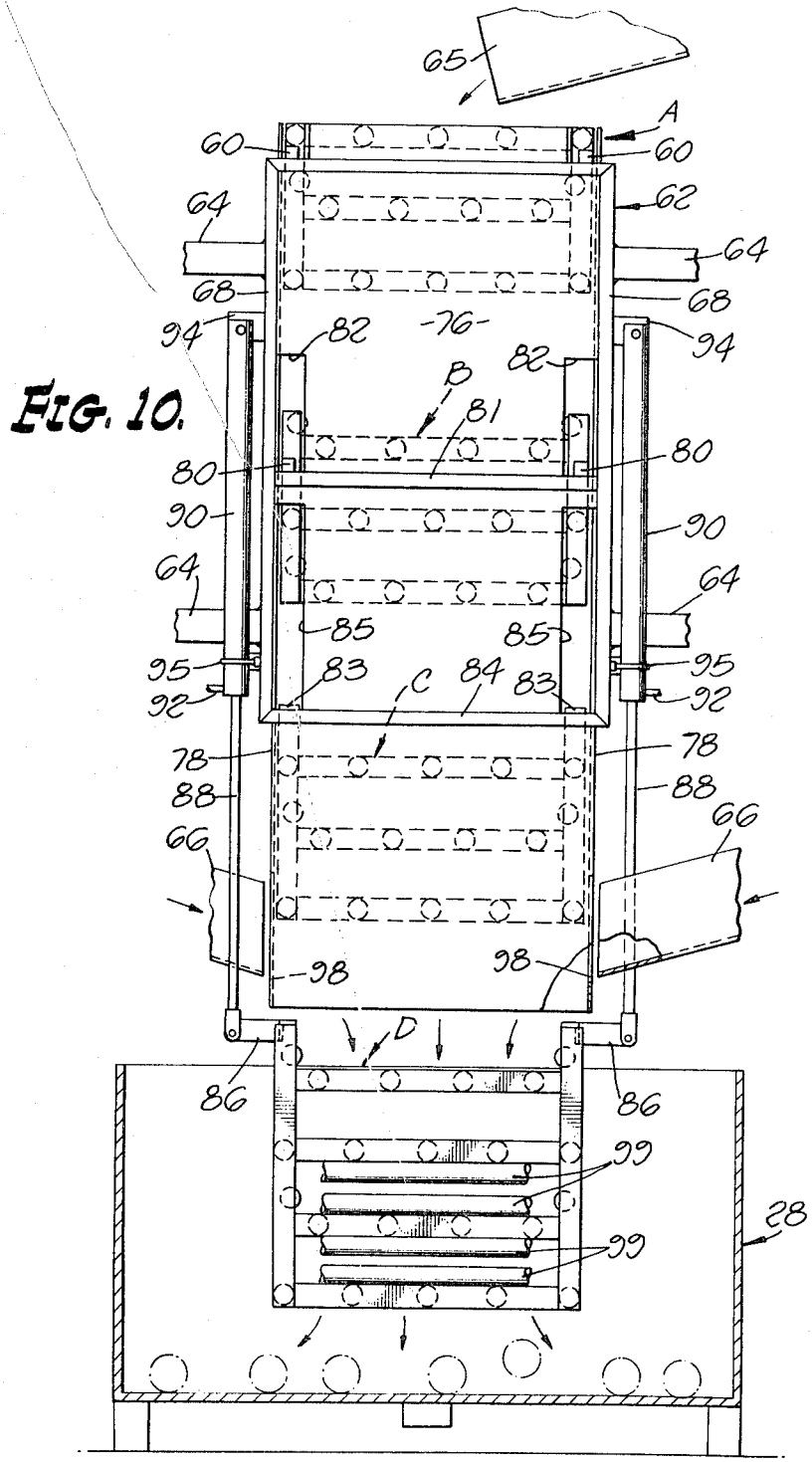
FIG. 10 is a front elevational view partly in section of an embodiment of the invention that is vertically extensible and contractable.

FIGS. 10–13 show the construction of a gravity conveyor of the character described that is vertically extensible and contractable instead of being vertically bodily movable. As shown in FIG. 10, the lower end of such a gravity conveyor may be extended downwardly into a bin 28 to deposit fruit in the bin and the lower end of the gravity conveyor may be retracted upwardly in accord with the rising level of the deposited fruit and to permit the gravity conveyor to clear the bin to permit an empty bin to be substituted for a full bin.

The support structure of the gravity conveyor shown in FIG. 10–13 is divided into sections comprising an upper fixed section designated A and successive lower movable sections designated B, C, and D. The upper section A rests by four lateral corner lugs 60 on the upper end of a vertical boxlike frame generally designated 62 which is fixedly anchored by a plurality of laterally extending support members 64. The support members 64 may be part of a mobile elevated structure for use by workers to pick fruit directly from trees in an orchard. The elevated mobile structure may include at least one upper chute 65 to convey fruit from the pickers to the top of the gravity conveyor and may be provided with lower chutes 66 to deliver picked fruit to lower levels of the gravity conveyor.

The boxlike frame 62 which has four vertical corner members 68 is provided with panels to form an upright enclosure, the panels including front and rear panels 76 and two opposite side panels 78, all of which panels extend below the frame to enclose the movable section C and to receive the lowermost movable section D when it is retracted upwardly.

Each of the four separate sections A–D of the gravity conveyor is of the same general construction as the previously described gravity conveyors as indicated by the use of corresponding numerals to designate corresponding parts. Thus, each of the four sections of the gravity conveyor has successive levels of spaced transverse barriers 12 with the transverse barriers of one level staggered relative to the preceding higher level.

At its normal lower limit level, movable section B is supported by four corner lugs 80 resting on intermediate horizontal members 81 of the frame 62 and the front and rear panels 76 are cut away to provide vertical slots 82 that clear the four corner lugs to permit vertical movement upwardly of the section B from its lower limit position. In like manner, a movable section C is provided with four corner lugs 83 which engage bottom transverse members 84 of the frame 62 to suspend the movable section C at its lowermost limit position. The front and rear panels 76 are cut away to provide vertical slots 85 that clear the corner lugs 83 to permit the desired range of vertical movement of the movable section C.

The lowermost movable section D is provided with two opposite rigid lateral arms 86 by means of which it is mounted on the lower ends of a pair of corresponding piston rods 88 that extend downwardly from corresponding pneumatic power cylinders 90. Each power cylinder 90 is connected by a flexible hose 92 to a suitable source of compressed air for vertical contraction and extension of the gravity conveyor by remote control.

In the construction shown, the upper end of each power cylinder 90 is pivotally connected to a corresponding bracket 94 on the boxlike frame 62 with the lower end of the power cylinder stabilized by a suitable U-bolt 95. As shown in FIG. 12, each of the two side panels 78 is formed with a vertical slot 96 to clear the corresponding lateral arm 86 of the lowermost movable section D and thus permit vertical movement of the lowermost movable section through the desired range.

The two side panels 78 are formed with suitable windows 98 (FIG. 12) to permit fruit to be discharged by the two lower chutes 66 into the interior of the gravity conveyor. In the position of the lowermost movable section D that is shown in FIG. 10, the fruit from the two lateral chutes 66 drops into the top of the lowermost movable section D but when the lowermost section is elevated the fruit from the two chutes may enter the lowermost section at an intermediate level thereof. Thus, raising and lowering the lowermost section D does not interfere with the fruit discharged by the two lower chutes.

Preferably, the lowermost movable section D is provided with means to deflect the gravitating fruit in opposite lateral directions to spread the fruit in the bin 28 as the fruit gravitates into the bin. For this purpose the lowermost movable section D may be provided with transverse deflectors 99 which, as shown in FIG. 12, span the interior of the lowermost movable section in perpendicular relationship to the barriers 12. In this instance the deflectors 99 are of the same construction as the barriers 12 and are arranged in two downwardly divergent rows.

When the gravity conveyor is retracted upwardly from its fully extended position shown in FIG. 10 to its fully contracted position shown in FIG. 13, the lowermost section D as it is lifted up by the two power cylinders 90 moves into abutment with the movable section C and then carries the section C upwardly until section C abuts the underside of section B and carries section B upwardly towards the uppermost fixed section A.

Our description in specific detail of the selected embodiments of the invention will suggest various changes, substitutions, and other departures from our disclosure.

We claim:

1. In a device for lowering a moving mass of fruit of generally spherical configuration from an upper level to a lower level, the combination of:
    a support structure defining a zone for gravitational movement of the fruit from the upper level to the lower level, the cross sectional dimensions of said zone in all lateral directions being multiple times the diameter of the fruit; and
    a plurality of barriers mounted on said structure across said zone,
    said barriers being of yieldable construction to minimize impact damage to the fruit and being distributed horizontally and vertically of the zone to provide at spaced levels a plurality of openings of greater horizontal dimension than the cross sectional dimension of the fruit for passage of the fruit therethrough for mass movement of the fruit through the zone,
    said barriers being positioned to repeatedly interrupt free fall of the fruit to limit the distance of free fall of the fruit through the zone to fractions of the distance between the upper and lower levels, said barriers being yieldable enough and said fractions being small enough to keep the fruit from accelerating to such high velocity as to cause significant damage to the fruit by impact against the interrupting barriers, said barriers being of elongated configuration and extending longitudinally across the zone with the opposite ends of the barriers anchored to said support structure,
    said barriers being resilient to act under tension to absorb impact forces.

2. A combination as set forth in claim 1 in which the barriers define a plurality of zigzag paths from the upper level to the lower level positioned to be entered and followed concurrently at random by the fruit.

3. A combination as set forth in claim 1 in which the cross dimensions of the barriers are less than the cross dimension of the fruit.

4. A combination as set forth in claim 1 in which the barriers are distributed laterally of the zone at successive intermediate levels to form openings at each level for downward passage of the fruit,
    the openings of the successive levels being staggered to cause interruption of the free falls of the fruit.

5. A combination as set forth in claim 1, which includes means to feed the fruit to said lowering means at at least one upper level of said spaced levels to feed the fruit to said lowering means;
    and which includes means to receive the fruit from the lowering means at the lower end thereof.

6. A combination as set forth in claim 1 in which the barriers have surfaces of resiliently deformable material.

7. A combination as set forth in claim 6 in which the cross dimension of the barriers is less than the cross dimension of the fruit.

8. A combination as set forth in claim 1 in which the barriers are distributed across the width of the zone at spaced successive intermediate levels;
    and which includes means between the successive levels to prevent exit of the fruit from the zone laterally of the zone.

9. A combination as set forth in claim 8 which includes additional similar barriers positioned between the intermediate levels adjacent side boundaries of the zone to prevent exit of the fruit from the zone laterally of the zone.

10. A combination as set forth in claim 1 in which said support structure is of open construction along at least one side to permit observation of the gravitating fruit and to permit access to the zone.

11. A combination as set forth in claim 10 in which said support structure is a framework that is open on all sides.

12. A combination as set forth in claim 1 for lowering citrus fruit in which the vertical spacing of the intermediate levels is in the range of 3 to 6 inches.

13. A combination as set forth in claim 12 in which the barriers are at least approximately 1½ inches wide.

14. A combination as set forth in claim 12 in which the barriers are of elongated configuration and extend longitudinally across the zone;
    and in which the barriers are resiliently extensible to act under tension to absorb impact forces.

15. A combination as set forth in claim 14 in which the barriers comprise tubes of resiliently deformable material with coil springs extending through the tubes and with the opposite ends of the springs anchored to the support structure for support of the tubes.

16. A combination as set forth in claim 1 which includes means incorporated in the bottom end of the support structure to divert the gravitating fruit in opposite directions for spreading of the fruit as they are discharged from the support structure.

17. In a device for lowering objects from an upper level to a lower level, the combination of:
 a support structure defining a zone for gravitational movement of the objects from the upper level to the lower level; and
 a plurality of barriers mounted on said structure across said zone,
 said barriers being distributed horizontally and vertically of the zone to provide at spaced levels a plurality of openings of greater horizontal dimension than the cross sectional dimension of the objects for passage of the objects therethrough for mass movement of the objects through the zone,
 said barriers being positioned to repeatedly interrupt free fall of the objects to limit the distance of free fall of the objects through the zone to fractions of the distance between the upper and lower levels, said fractions being small enough to keep the objects from accelerating to such high velocity as to cause significant damage to the objects by impact against the interrupting barriers,
 said barriers comprising tubes of resiliently deformable material with coil springs extending through the tubes for support thereof with the opposite ends of the springs anchored to the support structure.

18. In a device for lowering objects from an upper level to a lower level, the combination of:
 a support structure defining a zone for gravitational movement of the objects from the upper level to the lower level; and
 a plurality of barriers mounted on said structure across said zone,
 said barriers being distributed horizontally and vertically of the zone to provide at spaced levels a plurality of openings of greater horizontal dimension than the cross sectional dimension of the objects for passage of the objects therethrough for mass movement of the objects through the zone,
 said barriers being positioned to repeatedly interrupt free fall of the objects to limit the distance of free fall of the objects through the zone to fractions of the distance between the upper and lower levels, said fractions being small enough to keep the objects from accelerating to such high velocity as to cause significant damage to the objects by impact against the interrupting barriers,
 said barriers being distributed across the zone at successive intermediate levels of the zone to form a plurality of openings at each intermediate level with the openings of the successive levels staggered;
 in each pair of successive levels, an opening of the lower level of the pair at one end of the level being offset inwardly of the side boundary of the zone from the corresponding end opening of the higher level of the pair;
 at least one barrier being located below said end opening of the upper level of the pair and above said end opening of the lower level of the pair in a position to divert into the lower end opening objects that fall through the upper end opening thereby to prevent exit of the objects from the zone between the two levels.

19. A combination as set forth in claim 18 which includes means to feed objects to the zone laterally thereof at said end opening of an upper level of a pair of the successive intermediate levels.

20. In a device for lowering objects from an upper level to a lower level, the combination of:
 a support structure defining a zone for gravitational movement of the objects from the upper level to the lower level;
 a plurality of barriers mounted on said structure across said zone,
 said barriers being distributed horizontally and vertically of the zone to provide at spaced levels a plurality of openings of greater horizontal dimension than the cross sectional dimension of the objects for passage of the objects therethrough for mass movement of the objects through the zone,
 said barriers being positioned to repeatedly interrupt free fall of the objects to limit the distance of free fall of the objects through the zone to fractions of the distance between the upper and lower levels, said fractions being small enough to keep the objects from accelerating to such high velocity as to cause significant damage to the objects by impact against the interrupting barriers; and
 means to feed objects to the zone laterally of said structure at an intermediate level thereof.

21. A combination as set forth in claim 20 in which said feeding means is movable to different intermediate levels of the zone.

22. In a device for lowering objects from an upper level to a lower level, the combination of:
 a support structure defining a zone for gravitational movement of the objects from the upper level to the lower level;
 a plurality of barriers mounted on said structure across said zone,
 said barriers being distributed horizontally and vertically of the zone to provide at spaced levels a plurality of openings of greater horizontal dimension than the cross sectional dimension of the objects for passage of the objects therethrough for mass movement of the objects through the zone,
 said barriers being positioned to repeatedly interrupt free fall of the objects to limit the distance of free fall of the objects through the zone to fractions of the distance between the upper and lower levels, said fractions being small enough to keep the objects from accelerating to such high velocity as to cause significant damage to the objects by impact against the interrupting barriers;
 a receptacle below the support structure to receive the objects from the support structure; and
 fluid-pressure-actuated means to lower the lower end of the support structure into the receptacle to deposit the objects therein without impact damage to the objects and to raise the lower end of the support structure to clear the receptacle to permit replacement of the receptacle.

23. A combination as set forth in claim 22 in which the support structure is vertically expandable and contractable for retractable extension of the lower end of the support structure into the receptacle.

24. In a device for lowering objects from an upper level to a lower level, the combination of:
 a support structure defining a zone for gravitational movement of the objects from the upper level to the lower level;
 a plurality of barriers mounted on said structure across said zone,
 said barriers being distributed horizontally and vertically of the zone to provide at spaced levels a plurality of openings of greater horizontal dimension than the cross sectional dimension of the objects for passage of the objects therethrough for mass movement of the objects through the zone,
 said barriers being positioned to repeatedly interrupt free fall of the objects to limit the distance of free fall of the objects through the zone to fractions of the distance between the upper and lower levels, said fractions being small enough to keep the objects from accelerating to such high velocity as to cause significant damage to the objects by impact against the interrupting barriers, and said support structure being divided into a plurality of separate sections arranged in vertical sequence, said sections being constructed for relative vertical movement for vertical extension and retraction of the support structure.

25. A combination as set forth in claim 24 in which the sections are variably spaced apart with the maximum spacing between sections limited to prevent free fall of the objects of damaging extent from section to section.

26. A combination as set forth in claim 24 which includes remotely controlled power means connected to at least one of the sections for extension and retraction of the support structure.

27. A combination as set forth in claim 26 in which the power means is mounted on one section and is operatively connected to another section.

28. A combination as set forth in claim 24 in which the sections are interconnected by telescoping means.

29. A combination as set forth in claim 28 in which the telescoping interconnecting means between a higher section and a lower section supports the lower section from the higher section at the maximum vertical spacing of the two sections.

30. A combination as set forth in claim 24 which includes a series of successive sections in descending vertical sequence;

which includes telescoping means connecting each successive section to the preceding higher section for movement of the lower of the two sections between an upper position relative to the higher sections and a lower position at maximum spacing from the higher sections;

and in which the telescoping means suspends the lower section from the higher section at said lower position of maximum spacing.

31. A combination as set forth in claim 24 which includes:

an upper fixed section and at least two successive movable sections below the fixed section;

telescoping means connecting each successive section with the next higher section to permit a range of relative vertical movement of the lower section and to suspend the lower section from the higher section at the maximum limit of the range, the higher section of each pair of successive movable sections being in the path of upward movement of the lower section of the pair to permit the lower section to abut and lift the higher section; and power means to raise the lowermost movable section and thereby lift the remaining movable sections in sequence to contract the series of sections.

32. A combination as set forth in claim 31 in which said power means is fixed relative to the upper section and is operatively connected to the lowermost section.

33. In a device for lowering objects from an upper level to a lower level, the combination of:

a support structure defining a zone for gravitational movement of the objects from the upper level to the lower level;

a plurality of barriers mounted on said structure across said zone, said barriers being distributed horizontally and vertically of the zone to provide at spaced levels a plurality of openings of greater horizontal dimension than the cross sectional dimension of the objects for passage of the objects therethrough for mass movement of the objects through the zone, said barriers being positioned to repeatedly interrupt free fall of the objects to limit the distance of free fall of the objects through the zone to fractions of the distance between the upper and lower levels, said fractions being small enough to keep the objects from accelerating to such high velocity as to cause significant damage to the objects by impact against the interrupting barriers; and means incorporated in the bottom end of the support structure to divert the gravitating objects in opposite directions for spreading of the objects as they are discharged from the support structure, said barriers being of elongated configuration and extending across said zone in parallel relation, said diverting means including elongated deflector members extending across the zone perpendicular to the barriers.

34. A combination as set forth in claim 33 in which the deflector members are arranged in two downwardly divergent rows.

* * * * *